C. E. FAWKES AND C. W. McINTYRE.
AUTOGRAPHIC FILM PACK.
APPLICATION FILED JUNE 23, 1919.
1,368,029. Patented Feb. 8, 1921.
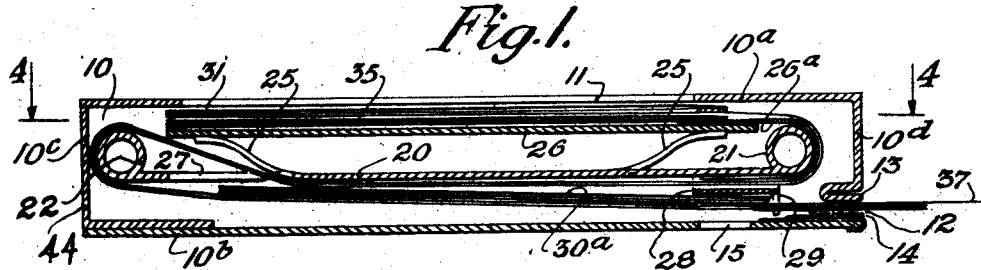
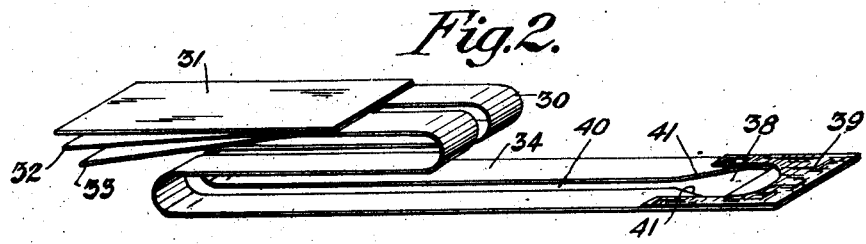
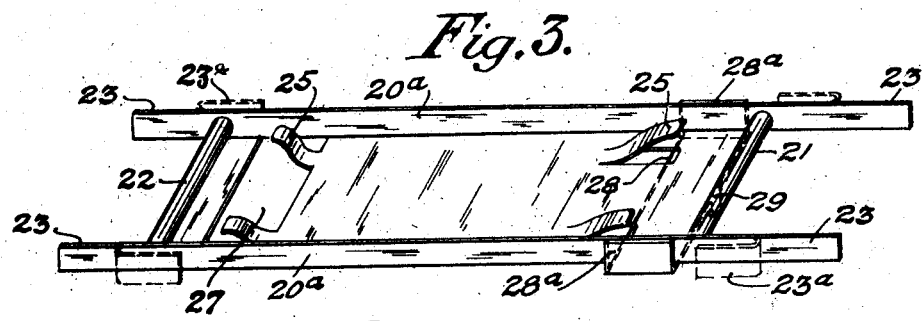
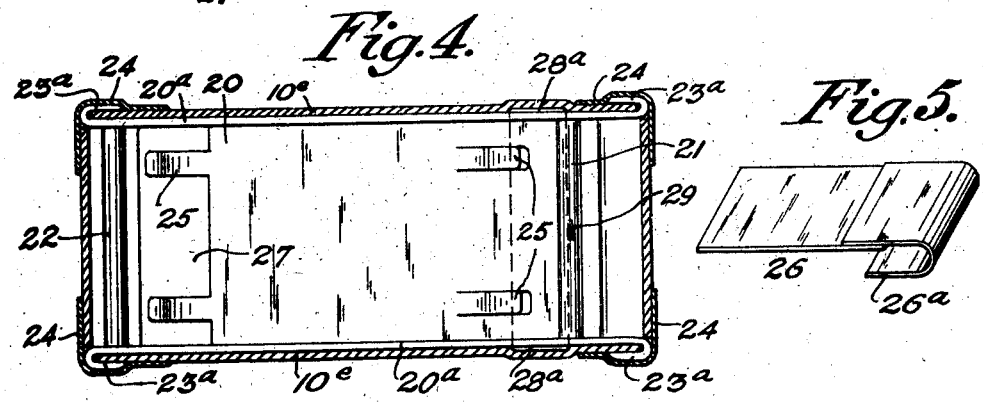
INVENTORS
Charles E. Fawkes
and Chauncey W. MacIntyre

UNITED STATES PATENT OFFICE.

CHARLES E. FAWKES, OF DUBUQUE, IOWA, AND CHAUNCEY W. McINTYRE, OF FARNHAM, NEW YORK.

AUTOGRAPHIC FILM-PACK.

1,368,029.   Specification of Letters Patent.   Patented Feb. 8, 1921.

Application filed June 23, 1919. Serial No. 306,066.

*To all whom it may concern:*

Be it known that we, CHARLES E. FAWKES, a citizen of the United States, residing at Dubuque, in the county of Dubuque and State of Iowa, and CHAUNCEY W. McINTYRE, a citizen of the United States, residing at Farnham, in the county of Erie and State of New York, have invented certain new and useful Improvements in Autographic Film-Packs, of which the following is a specification.

This invention relates to photographic film packs of the type in which a plurality of flat flexible films are arranged in a pack and separately exposed in a photographic camera, and the purpose of the invention is to provide means for mounting and manipulating the films to permit the dating and titling of the successively exposed films immediately after exposure.

The principal object of the invention is to provide a light tight container comprising an exposure chamber and a dark storage chamber communicating with each other to permit the removal of the films from one chamber to the other after exposure, means being provided for autographing the films after they have been withdrawn into the storage chamber. A further feature of the invention is the provision of means for permitting one or more of the exposed or autographed films to be drawn into the storage chamber for autographing without disturbing or fogging the unexposed films in the pack. A further object of the invention is to provide an improved partition member for the container in combination with improved means for mounting the same. Another important feature of the invention is the provision of an improved manipulating member for each film. Other objects relate to various features of construction and arrangement which will be set out more fully hereinafter.

The nature of the invention will be understood from the following specification taken with the accompanying drawings, in which one embodiment is illustrated.

In the drawings—

Figure 1 shows a longitudinal sectional view through the container and its contents;

Fig. 2 is a perspective view of one of the films and the manipulating member thereof;

Fig. 3 is a perspective view of the partition member;

Fig. 4 is a horizontal sectional view on the line 4—4 of Fig. 1, showing the method of mounting the partition member in the container; and Fig. 5 is a perspective view of the follower board which is mounted on the inner side of the pack of unexposed films.

Our improved film pack comprises a substantially flat container or casing 10 having a front wall $10^a$, a rear wall $10^b$, end walls $10^c$ and $10^d$, and side walls $10^e$. This casing is formed preferably of a single sheet of opaque material, such as heavy paper or card-board, the edges being joined along the rear wall $10^b$, and the opposite front wall $10^a$ being provided with a rectangular exposure opening 11. A longitudinal slit or outlet opening 12 is provided in the end wall $10^d$, the material bounding one edge of this opening being reversibly bent to form a pressure member 13 which bears upon one side of the series of manipulating members of the films which extend through the opening. The extremity of the side wall $10^b$ which bounds the other side of the outlet opening 12 is provided with a mat 14 of pile-cloth or hair fabric which engages the opposite sides of the manipulating members in order to exclude light from the interior of the casing. The rear wall $10^b$ is provided adjacent the outlet opening 12 with a transversely extending rectangular autograph opening 15 through which a stylus or other member may be inserted for the purpose of dating and titling the film, as hereinafter described.

A partition member 20 of sheet metal or the like is mounted within the casing 10 to divide the same into two chambers, one of which is adapted to contain the unexposed films opposite the opening 11, while the other is adapted to hold the films after they have been exposed. The partition member 20 comprises a flat plate having parallel side walls or flanges $20^a$. The body portion of the partition member is provided at opposite ends thereof with rolls 21 and 22, and the side walls $20^a$ are extended beyond these rolls, forming tongues 23 which are reversely bent, as shown at $23^a$, around the ends of the side walls $10^e$ of the casing, thus holding the partition member firmly in position. Strips of suitable adhesive plaster 24 are pasted over the reversely bent tongues 23, as shown at Fig. 4, on the outer side of the casing. Portions of the partition member are cut away and bent upwardly to form flexible arms 25 which seat against the inner side of the follower-board 26 and thereby push the films forwardly toward the exposure opening 11. A sheet 26ª of black paper is secured to one end of the follower-board and extended around the roll 21 to provide a smooth surface for the film to pass over around the end of the follower board on the roll 21. A rectangular opening 27 is provided in the partition member adjacent the roll 22 to receive the films and the manipulating members thereof as they are passed from the exposure chamber to the storage chamber. A bridge 28 is secured to the side walls 20ª of the partition member by means of end flanges 28ª, and this bridge wall is spaced from the body portion of the partition member, as shown in Fig. 1, and located opposite the autograph opening 15 for a purpose hereinafter described. A centrally located tongue 29 is formed on one edge of the bridge 28 and projects rearwardly therefrom toward the wall 10ᵇ to limit the movements of the films.

Each film unit 30 comprises a film proper 31 of rectangular form having a sheet 32 of normally opaque plastic material, adapted to be fractured under pressure, mounted on the rear side thereof and secured thereto at its forward end. A backing sheet 33 made of slightly translucent paper, preferably red in color, for transmitting light of some actinic quality, is mounted on the rear side of the sheet 32 and also secured to the sheet 32 and to the film 31 at one end thereof. The backing 33 extends beyond the film 31 and forms the manipulating member 34 of the film unit. When the film units are assembled in the casing, the films and associated parts form a pack 35 located opposite the exposure opening and seating against the follower-board 26. An opaque cover sheet is normally placed over the pack opposite the exposure opening to protect the unexposed films. The manipulating sheets 34 extend from the films 31 around the roll 21 from which they are carried in the reverse direction, through the opening 27 previously described, and around the roll 22 at the other end of the partition member. The manipulating members are then reversed in direction toward the end wall 10ª of the casing and are carried outwardly through the outlet opening 12. The manipulating members 34 after passing around the roll 21 are carried between the body portion of the partition member and the bridge 28, but the reverse stretches of these manipulating members after passing around the roll 22 are carried on the opposite side of the bridge and between the bridge and the autograph opening 15. The ends of the manipulating members project through the opening 12 and form a series of tabs 37 which may be engaged by the fingers of the operator when it is desired to move the films within the casing. The manipulating members 34 are provided with openings 38 adjacent the projecting tabs 37, and when the film units are in position in the casing 10, these openings register with each other between the bridge 28 and the autograph opening 15. The tab 37 and the end of the manipulating member adjacent the opening 38 of each film unit is reinforced by a sheet of bolting-cloth or other strengthening material 39, the sides of which extend inwardly past the opening 38. A longitudinal centrally located slot 40 extends completely through each manipulating sheet 34 from the opening 38 to the end of the film 31, this slot being adapted to be engaged by the projecting tongue 29 carried by the bridge during the operation of moving a film from the exposure chamber to the storage chamber. The sides of the opening 38 are inclined, as shown at 41, so that upon the initial movement of each film unit the tongue 29 will be guided into the slot 40 by the inclined walls 41 in case the film should be slightly displaced in a lateral direction. An operably folding door 44 is provided in the end of the casing opposite the slot 12 to permit the withdrawal of the pack of films after they have been exposed.

After the uppermost film of the pack 35 has been exposed in a camera, the operator seizes the tab 38 of that film unit and pulls outwardly thereon, thereby causing the exposed film to travel over the roll 21, thence along the rear of the partition member, through the opening 27, and then around the roll 22, after which it arrives at the position designated by the numeral 30ª in Fig. 1. During the travel of the film, the slot 40 in the manipulating sheet 34 is engaged by the tongue 29 and when the film reaches the position 30ª, the tongue 29 engages the end of the slot 40, and thus prevents further movement thereof while at the same time indicating to the operator that the film has reached the proper position in the storage chamber to be autographed. It will be observed that after arriving at the position 30ª, the film lies between the autograph opening 15 and the bridge 28 and that the backing sheet 33 is directed outwardly toward the opening, while the face of the film 31 is directed inwardly toward the rear side of the partition member. The operator can then insert a stylus through the opening 15 and through the registering openings 38 in the manipulating sheets of the unexposed films until it engages the backing 31. The date and title of the film may then be written with the stylus on the backing 31, and the pressure of this writing will rupture the sheet 32 and permit light to pass therethrough after being diffused by the backing, thereby forming a developable impression on the film. In this way the films may be exposed and moved into the storage chamber in succession, each film being autographed immediately after it is exposed. After the film has been moved into position in the storage chamber, the manipulating sheet 34 thereof may be torn off and after all of the films have been exposed, the casing 10 may be torn off to permit development of the pack of films.

While we have shown and described one form of the invention for purposes of illustration, it will be understood that it may be constructed in various other forms without departing from the scope of the appended claims.

What we claim is:

1. The combination of a casing having an exposure opening, a series of films arranged in a pack opposite said opening, means for exposing said films successively, and means for permitting the autographing the body portions of said films while in said casing.

2. The combination of a casing having an exposure opening, a partition dividing said casing into an exposure chamber and a storage chamber, a series of films arranged in a pack in said exposure chamber opposite said exposure opening, means for moving the exposed films into said storage chamber, and means for permitting the autographing the rear sides of the body portions of said films while in said storage chamber.

3. The combination of a casing having an exposure opening and an autograph opening, a series of films arranged in a pack opposite said exposure opening, and means for exposing said films successively and moving them to positions with their rear sides presented toward said autograph opening.

4. The combination of a casing having an exposure opening, a series of films arranged in a pack opposite said opening, means for exposing said films successively, means for moving each exposed film to present the rear side thereof toward an outer wall of said casing, and means to permit the autographing each exposed film by an instrument inserted through said casing.

5. The combination of a casing having an exposure opening, a series of films arranged in a pack opposite said opening, means for moving each of said films after exposure to the rear of said pack with the face of the film directed toward said exposure opening, and means for allowing the formation of a developable impression on each exposed film from the rear side thereof.

6. The combination of a casing having an exposure opening and an autograph opening in the walls thereof, a series of films arranged in a pack in said casing with their faces directed toward said exposure opening, and means for moving each of said films after exposure to a position with the rear side thereof directed toward said autograph opening.

7. The combination of a casing having an exposure opening, a series of films arranged in a pack opposite said exposure opening, each film having a fracturing sheet and a backing sheet mounted on the rear side thereof, and means for moving said films after exposure to present said backing sheets toward an outer wall of said casing, said outer wall having an autograph opening therethrough, whereby the exposed films may be autographed by exerting pressure on said backing sheet, thereby rupturing said backing sheet.

8. The combination of a casing having an exposure opening and an autograph opening, a series of films arranged in a pack within said casing, a series of manipulating members each connected to one of said films, and means coöperating with said manipulating members to permit the removal of each exposed film to autographing position with the rear side thereof directed toward said autograph opening.

9. The combination of a casing having an exposure opening and an autograph opening, a series of films arranged in a pack within said casing, a series of manipulating members each connected to one of said films, and means coöperating with said manipulating members to permit the removal of each exposed film to autographing position with the rear side thereof directed toward said autograph opening, said manipulating sheets having apertures therethrough to receive an autographing member inserted through said autograph opening and engaging the exposed film.

10. The combination of a casing having an exposure opening and an autograph opening, a series of unconnected flexible films arranged in a pack opposite said exposure opening, means for bending said films and reversing the position thereof in said casing a plurality of times, and means for allowing the formation of a developable impression on each film after it has been reversed.

11. The combination of a casing having an exposure opening, a series of flexible films arranged in a pack opposite said opening, a series of separate manipulating sheets each attached to the end of one of said films, and operating members in opposite ends of said casing around which said manipulating sheets are passed, said casing having an outlet opening through which the projecting ends of said manipulating sheets extend.

12. The combination of a casing having an exposure opening, a series of flexible films arranged in a pack opposite said opening, a fracturing sheet secured to the rear side of each film, a backing sheet secured to each film on the rear side of the fracturing sheet, manipulating members secured to one end of each film, and means engaging said manipulating members to permit the operation thereof for reversing the positions of the exposed films in said casing and presenting the backing sheets thereof toward an outer wall of said casing, said casing having an outlet opening through which the ends of said manipulating members extend.

13. The combination of a casing having an exposure opening, a series of flexible films arranged in a pack opposite said opening, a fracturing sheet secured to the rear side of each film, a backing sheet secured to each film on the rear side of the fracturing sheet, manipulating members secured to one end of each film, means engaging said manipulating members to permit the operation thereof for reversing the positions of the exposed films in said casing and presenting the backing sheets thereof toward an outer wall of said casing, said casing having an outlet opening through which the ends of said manipulating members extend, and means coöperating with said manipulating members to limit the movement of the exposed films.

14. The combination of a casing having an exposure opening and an autograph opening, a series of flexible films arranged in a pack opposite said exposure opening, a series of manipulating sheets each attached to one of said films, supporting members mounted in said casing and engaging said manipulating sheets to effect a double reversal of the position of each film when said sheets are manipulated, thereby presenting the rear side of each exposed film toward said exposure opening, and means to permit the operation of said manipulating sheets while excluding light from said casing.

15. The combination of a casing having an exposure opening in one side thereof and an autograph opening in the opposite side thereof, a series of films arranged in a pack thereof, a series of films arranged in a pack in said casing and directed toward said exposure opening, a series of flexible manipulating sheets each attached to the end of one of said films, a pair of rolls mounted adjacent opposite ends of said casing, said manipulating sheets being extended around said rolls with their free ends adjacent the end of said casing opposite that toward which the free ends of said films are directed, said casing having an outlet opening through which the free ends of said manipulating sheets are extended, and means for allowing the formation of a developable impression on each exposed film after it has been presented opposite said autograph opening by the manipulation of its connected sheet.

16. The combination of a casing having an exposure opening in one side thereof and an autograph opening in the opposite side thereof, a series of flexible films arranged in a pack in said casing and directed toward said exposure opening, a series of flexible manipulating sheets each attached to one end of one of said films, and a pair of rolls mounted adjacent the opposite ends of said casing with said manipulating sheets passed around them, said casing having a slot through which the free ends of said sheets extend, said manipulating sheets having apertures therethrough normally located in register with said exposure opening to permit the insertion therethrough and through said autograph opening of a member adapted to engage the last exposed film after it has been moved around said rolls by the manipulation of its connected sheet.

17. The combination of a casing having an exposure opening in one side thereof and an autograph opening in the opposite side thereof, a series of flexible films arranged in a pack in said casing and directed toward said exposure opening, a series of flexible manipulating sheets each attached to one end of one of said films, a pair of rolls mounted adjacent the opposite ends of said casing with said manipulating sheets passed around them, said casing having a slot through which the free ends of said sheets extend, said manipulating sheets having apertures therethrough normally located in register with said exposure opening to permit the insertion therethrough and through said autograph opening of a member adapted to engage the last exposed film after it has been moved around said rolls by the manipulation of its connected sheet, and a bridge member adapted to underlie the exposed films opposite said autograph opening.

18. The combination of a casing having an exposure opening in one side thereof and an autograph opening in the opposite side thereof, a partition member mounted in said casing to divide the same into an exposure chamber and a storage chamber, said partition member having projecting tongues on the ends thereof which are bent around the side walls of said casing to hold the partition in position, a series of films mounted in said exposure chamber, a series of manipulating sheets each connected to one of said films, a pair of rolls carried at opposite ends of said partition member, said partition member having a slot therethrough adjacent one of said rolls, said manipulating sheets being extended over one of said rolls and along the rear side of said partition member where they pass through said slot and around the other roll from which they extend in the opposite direction toward the other end of said casing, and a bridge member mounted between the stretches of said manipulating sheets opposite said autograph opening, said manipulating sheets having apertures which normally coöperate with said autograph opening and said bridge member.

In testimony whereof we have subscribed our names.

CHARLES E. FAWKES.
CHAUNCEY W. McINTYRE.